United States Patent [19]

Takada

[11] 4,126,356
[45] Nov. 21, 1978

[54] SEAT BELT WEBBING CONSTRUCTION

[75] Inventor: Juichiro Takada, Tokyo, Japan

[73] Assignee: Takata Kojyo Co., Ltd., Tokyo, Japan

[21] Appl. No.: 865,048

[22] Filed: Dec. 27, 1977

Related U.S. Application Data

[63] Continuation of Ser. No. 709,369, Jul. 28, 1976, abandoned.

[30] Foreign Application Priority Data

Jul. 29, 1975 [JP] Japan .............................. 50-091606

[51] Int. Cl.$^2$ .................................... A62B 35/00
[52] U.S. Cl. .................................... 297/386; 297/389
[58] Field of Search ................. 297/389, 385, 386; 139/423

[56] References Cited

U.S. PATENT DOCUMENTS

| 2,558,336 | 6/1951 | Boivin | 139/423 X |
| 3,189,972 | 6/1965 | Vernier | 139/423 X |
| 3,322,163 | 5/1967 | Hughes | 297/385 X |
| 3,414,322 | 12/1968 | Linderoth | 297/385 X |
| 3,897,106 | 7/1975 | Takada | 297/389 |

*Primary Examiner*—Francis K. Zugel
*Attorney, Agent, or Firm*—Wolder, Gross & Yavner

[57] ABSTRACT

A seamless combined vehicle safety shoulder and waist belt has a shoulder section which is plastically elongatable and of high energy absorption, and a waist section of high tensile strength. The shoulder section is thinner than the waist section, the shoulder section including weft interwoven warps and linear core warps enclosed between the opposite faces of the shoulder section, and the waist section includes all of the shoulder section warps and additional warps, all the waist section warps being interwoven with wefts. In producing the belt, it is continuously woven with successive alternate waist and shoulder sections, the warps which form the waist sections and not in the shoulder sections floating in the shoulder sections and being thereafter severed proximate the areas of junction.

4 Claims, 9 Drawing Figures

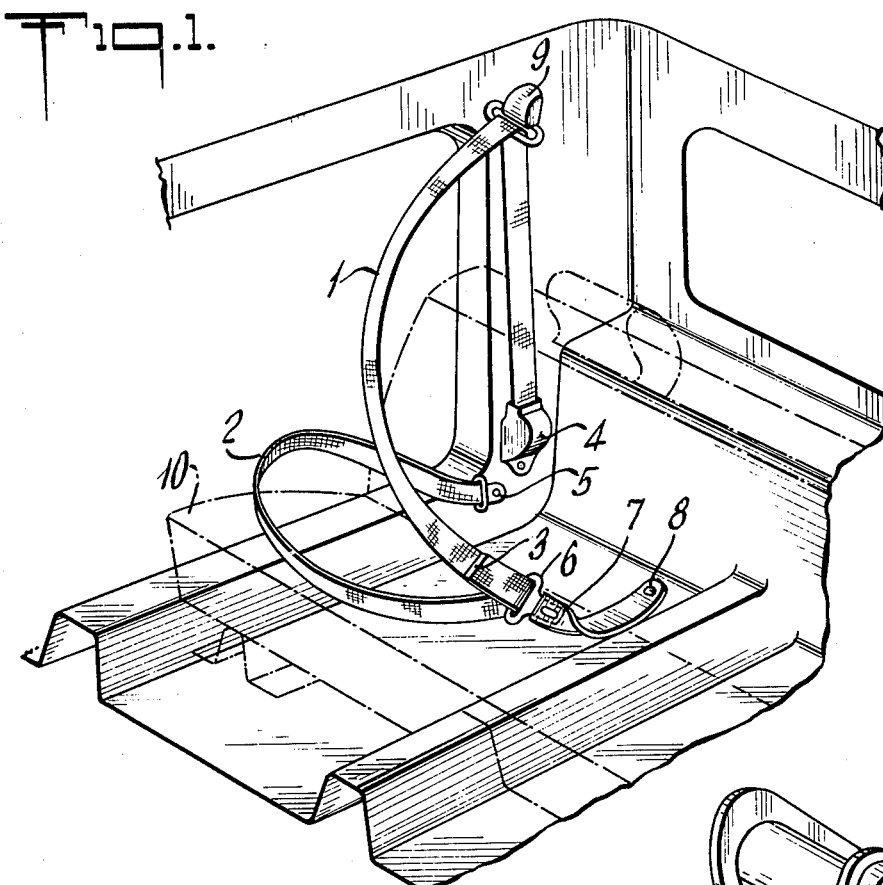
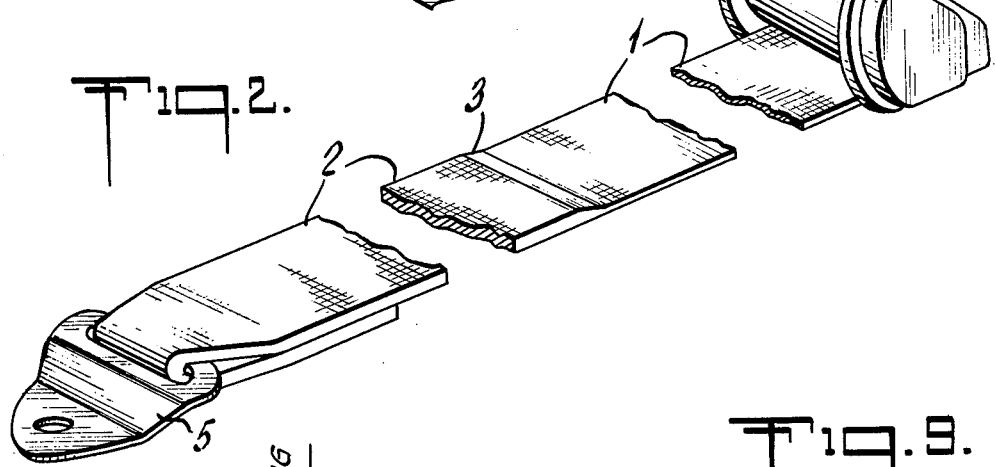
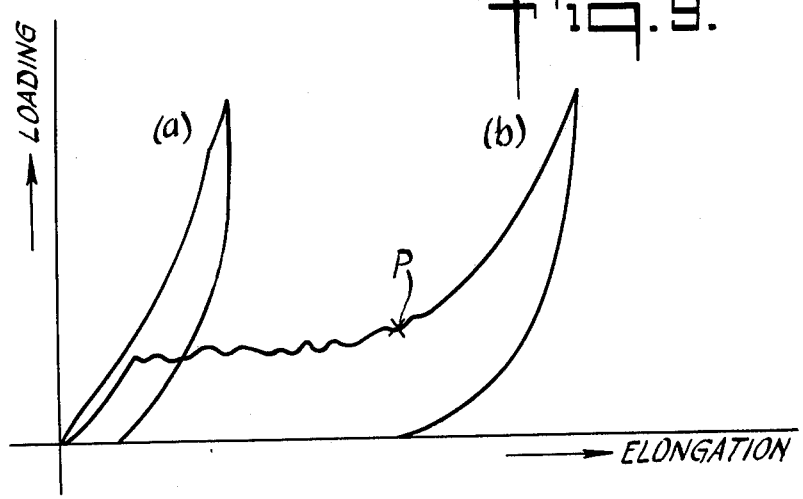

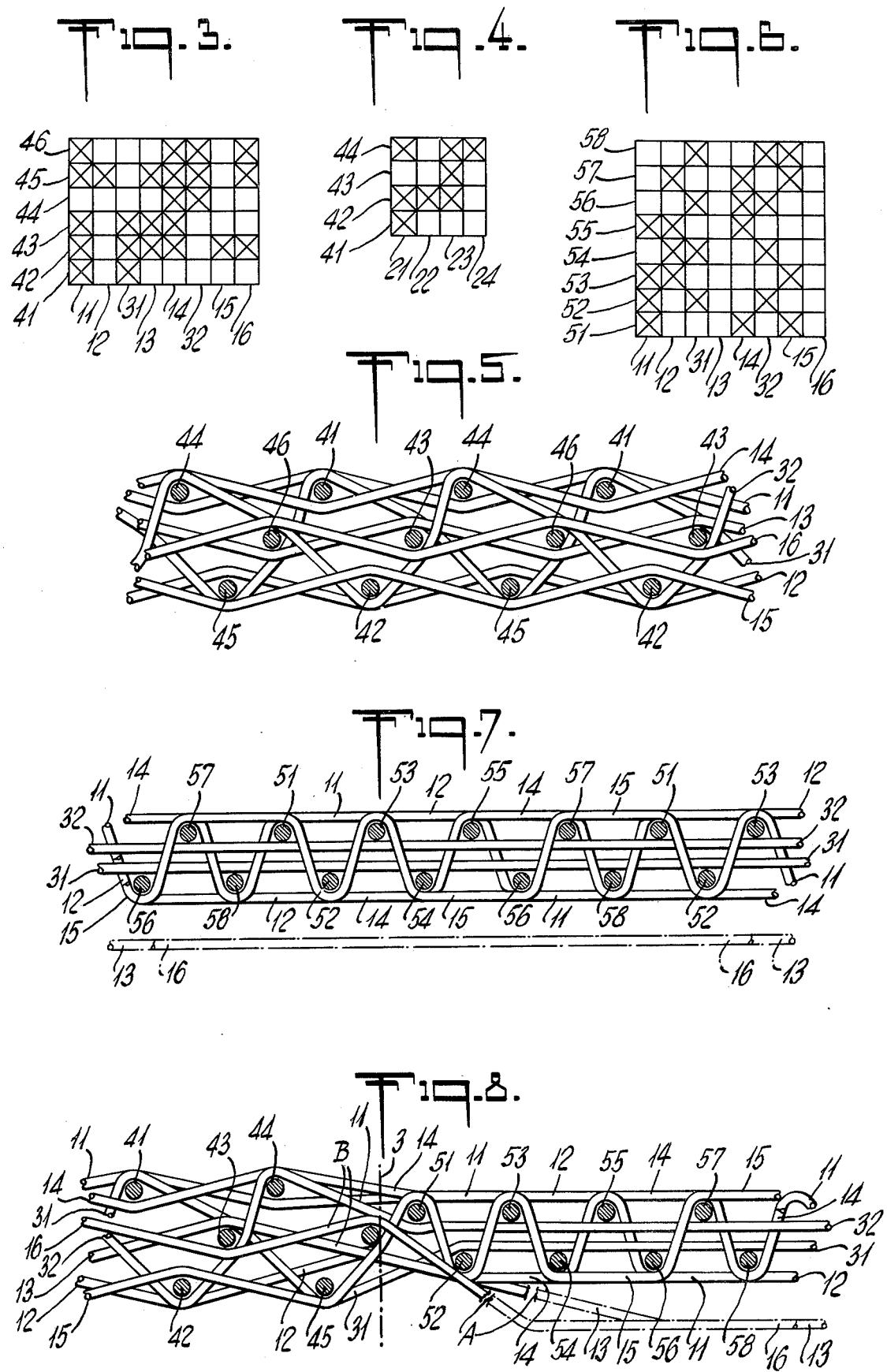

SEAT BELT WEBBING CONSTRUCTION

This is a continuation of application Ser. No. 709,369 filed July 28, 1976 now abandoned.

BACKGROUND OF THE INVENTION

The present invention is concerned with a novel seat belt assembly for use in vehicles, having rich energy absorbing property and by which the retracting amount by the retractor is increased, thereby promoting use of the retractor.

The seat belts have generally been employed to mitigate mechanical shocks to the passengers of vehicles such as automobiles and air craft resulting to provide safety performance. The seat belts of this sort were so far studied from various aspects and angles, and many proposals were so far presented.

In the early days, the belts were manufactured in two-point type to hold only the waist, but to attain more reliable safety performance, the belts were made in three-point type having an additional belt to hold the shoulder. In recent days there has been proposed the belts of the type in which the waist belt and the shoulder belt are made in a continuous form. The belt system of the aforesaid continuous type has an advantage that they need just only less retractor units than retractor units required by the aforesaid three-point belt system. The modern trend, however, has been placing increasing demand for the belts to provide more energy absorption, which has resulted in the use of shoulder belts having large absorption of energy. However, the belts of the aforesaid continuous type have to be made by joining together an ordinary belt and a belt having high energy absorption. Hence the joined place gives an uncomfortable touch feeling to the human body, and comes into contact with the guide members of the retractor when the belt is not being taken up along smooth retracting movement. It is, therefore, desired to make the belt with a single woven fabric without seams to improve the aforementioned defects. At present, however, to make such a belt is technically difficult and no satisfactory solution has been found.

In recent years, increased concern with regard to the improvement of retractors has resulted in the manufacture of retractors of various types. Such retractors, however, have all been design based on a prerequisite that the thickness of the belt is equal along the lengthwise direction, thereby imposing a limit to the amount of taking up the belt. To increase the take-up amount, the retractor must have increased volume, losing economy in space, particularly when it is used for the vehicles having narrow room. This is a fatal defect of the belt of the aforementioned continuous webbing type, losing the balance of whole parts of the vehicle. From such viewpoint, it is an important assignment to increase the take-up space just with using a retractor of an ordinary size.

SUMMARY OF THE INVENTION

The inventor of the present invention has conducted extensive study in an effort to solve the aforementioned defects by giving attention to the aforesaid various points, and has found an effective means by which the belts can be formed continuously as a single unit based on the characters required for the shoulder belt and the waist belt.

It is known, in general, that the shoulder belt requires less tensile strength than the waist belt. For example, the waist belt requires a tensile strength of more than 2700 kg, whereas the shoulder belt requires only tensile strength of up to 1800 kg. Particularly, it was confirmed by experiments conducted by the U.S. National Highway Transport Safety Agency (NHTSA) that where a belt having property to absorb energy is used for the shoulder belt, the tensile strength needs not necessarily be 1800 kg, but may be sufficient if the belt has a tensile strength of 500 kg. It is, therefore, recognized that the shoulder belt may have less thickness than that of the waist belt and may have less strength to sufficiently attain the desired object.

The seat belt of the present invention was designed under the above said situations and comprises a seamless and continuous webbing having a belt to hold the waist and a belt to hold the shoulder, characterized in that the belt portion of holding the shoulder of said webbing is thinner and has less strength than the waist portion of the belt, and further has an extension property that does not restore to the initial state under a certain load condition that substantially causes the belt to extend by a certain length. The invention is illustrated below with reference to a concrete embodiment shown in the accompanying drawings. But it should be noted that the present invention is not restricted to the below mentioned embodiment only but permits various design modifications without departing from the objects of the present invention.

BRIEF DESCRIPTION OF THE DRAWINGS

FIG. 1 is a perspective view showing an example of using the seat belt of the present invention.

FIG. 2 is a partially omitted perspective view showing the appearance of the seat belt of the present invention.

FIG. 3 is a diagram showing an example of the texture of the waist belt of the seat belt of the present invention.

FIG. 4 is a diagram to show an example of the texture of a selvage of the seat belt of the present invention.

FIG. 5 is a vertical cross-sectional view showing the texture of FIG. 3 of the waist belt of the seat belt of the present invention.

FIG. 6 is a diagram showing an example of the texture of the shoulder belt of the seat belt of the present invention.

FIG. 7 is a vertical cross-sectional view showing the texture of FIG. 6 of the same seat belt.

FIG. 8 is a vertical cross-sectional view showing the texture at the boundary part of the waist belt and the shoulder belt of the seat belt of the present invention, and FIG. 9 is a diagram showing curves of load and extension of the waist belt and the shoulder belt of the seat belt of the present invention.

DESCRIPTION OF THE PREFERRED EMBODIMENTS

FIG. 1 shows a diagram to illustrate an example in which a seat belt of the present invention is employed, in which the reference numeral 1 stands for a shoulder belt, and the reference numeral 2 represents a waist belt. These two belts 1 and 2 form a belt made of a single continuous webbing via a boundary part 3 as shown in FIG. 2. The shoulder belt 1 is thinner than the waist belt 2. The belt composed of these shoulder belt 1 and waist belt 2 will usually have a retractor 4 and a fastening fitting 5. The belt is passed through a slidable tongue piece 6 locating as a middle suspending matter; the slidable tongue piece 6 will be engaged with a buckle 7 which is suspended to an anchorage hole 8 selected within the vehicle inside. The reference numeral 9 is a member to guide and direct the shoulder belt position 1 that was pulled out from the retractor 4 fixed on some place of the side wall. The member 9 is not necessary if the retractor is provided here at this position. Also, the reference numeral 10 represents a seat in the vehicle.

FIGS. 3 to 5 are diagrams to show an example of weaving waist belt 2, FIG. 6 and 7 are diagrams to show an example of a woven texture of the shoulder belt 1, and FIG. 8 shows an embodiment of a texture at the boundary part 3 between portion belt 1 and 2. In the drawings, the reference numerals 11, 12, 13, 14, 15 and 16 are warps in a complete texture. The above warps are arrayed in many number in parallel, and to both sides thereof are added warps 21, 22, 23 and 24 having selvage shown in FIG. 4 to determine the belt width of the present invention. The reference numerals 31 and 32 are warps having smaller elongation than the warps 11 to 16. Further, the reference numerals 41, 42, 43, 44, 45 and 46 are wefts in the waist belt 2, and the reference numerals 51, 52, 53, 54, 55, 56, 57 and 58 are wefts in the shoulder belt 1. In FIGS. 3 to 5, the aforesaid warps 11 to 16 and 31, 32 are crossed and interlinked by the wefts 41 to 46 by way of triple weaving shown in FIG. 3 to form the waist belt 2. In this case, the selvage texture shown in FIG. 4 is added to both sides of fabrics in FIG. 3. In FIGS. 6 and 7, the warps 11, 12, 14 and 15 among the warps 11 to 16 and 31, 32 in the aforesaid waist belt 2 are crossed and interlinked together with the wefts 51 to 58 and double weaving of wefts diagramatized in FIG. 6 and further the warps 13 and 16 are floated, without being woven and arrayed in parallel, outside of the aforesaid crossed and bonded texture. The warps 31, 32 are crossed and interlinked with the wefts in the aforesaid waist belt 2, and are running as core yarns being retained inside of the texture composed of warps 11, 12, 14, 15 and wefts 51 to 58, as seen in FIG. 7; the warps 31, 32 are not exposed outside of the texture. As mentioned above, the fabric of the shoulder belt 1 of the present invention is formed by the interrelated function among the warps 11, 16, 31, 32 and wefts 51 to 58.

The aforesaid selvage texture diagramatized in FIG. 4 is also added to both sides of the shoulder belt 1. Here the aforesaid waist belt 2 and the shoulder belt 1 are constituted as a single continuous webbing without seam. In this texture, the boundary part 3 between the two belts 1 and 2 is shown in FIG. 8. That is, the warps 11, 12, 14, 15, 31 and 32 forming the waist belt 2 are taken over by the fabric of the shoulder belt 1. The floating warps 13 and 16 are cut away at a part A where they appear out of the fabric. The cut-away part is then removed appropriately, and the position A at the end is then dyed and transferred to the position B of FIG. 8, and then buried and retained in the texture of the waist belt 2. In this way, a continuous seamless webbing is formed with the waist belt 2 and the shoulder belt 1 together. In the foregoing description, the warps are preferably cut away in an amount within the range of 10 to 40% in relation to the thickness and strength of the belt, so that the thickness is reduced into appropriately favorable value relative to the thickness of the waist belt 2.

Although the foregoing description has dealt with the transfer from the waist belt 2 toward the shoulder belt 1, it should be noted that the webbing of the present invention is made for manufacturing a long texture in which the waist belt 2 and the shoulder belt 1 are repeated alternately; the same structure is repeated from the shoulder belt 1 toward the waist belt 2. However, here, as for the order of wefts, the weft 41 in place of weft 46 in the waist belt 2 is woven next of the weft 58 of the shoulder belt 1. Materials of wefts and warps for use in the webbing texture of the present invention may be thermoplastic synthetic fibers such as nylon, vinylon, polyester, polyprene esters, and various fibers such as viscose rayon, cotton, hemp, etc. Among the above thermoplastic synthetic fibers, particularly preferred examples are nylon and polyester fibers. These fibers may often be employed by being mixed together. The warps 31 and 32 that serve as core yarns may be made of a polyester fiber, vinylon, metallic fiber and glass fiber. Particularly preferred example may be a reformed fiber that is known as fiber B having less elongation. The core yarns, however, are selected best by comparison with the warps constituting the fabric.

The webbing by which the waist belt 2 and the shoulder belt 1 are connected for a single unit, is terminated to the aforesaid retractor 4 and to the fastening fitting 5, and is used for a seat belt as shown in FIG. 1. Also, in this case, the mounting positions of the retractor 4, fastening fitting 5, buckle 7 and indoor member 9 cannot be limited to the positions shown in FIG. 1 but may be mounted at any appropriate positions. In the present invention, in particular, the shoulder belt 1 is thin and is allowable to be mounted directly on the seat 10, which possibility is an advantage of the belt of the present invention.

When mechanical impact is applied to the aforementioned seat belt, the waist belt 2 having large strength and thickness securely holds the human body, and the shoulder belt 1 which is made thin and has smaller strength undergoes stretch easily when the impact is applied, whereby the core yarns are broken step by step in order, and then the determined load is reached and further acting point extends to a set point P shown in FIG. 9 to absorb the energy exerted on the human body. FIG. 9 shows this state, wherein the load and extending elongation degree exerted on the waist belt 2 as measured under the Standard, is diagramatized in diagram (a). The diagram (a) shows less degree of elongation and less work done. However, if the elongation of the shoulder 1 is set at 30%, for example, under a determined load of 300 kg, the core yarns will be broken down step by step at around 300 kg loaded, so that the flat portion such as in the diagram (b) may continue from an extension degree about 4 to 8% started to a set point P of about 30% indicated there. Further, if the loading is increased up to 1130 kg specified value under the Spec. MVSS, the extension reaches about 45%, at which the belt does not restore to the initial state (length) even after the load of 1130 kg is removed; the amount of work done is very large as compared to that of the waist belt 2. From the abovementioned fact, even a single continuous seamless webbing has the performance being comparable to a conventional three-point type seat belt employing energy-absorbing belt for a shoulder belt. The fact proves that the seat belt by the present invention has excellent performance.

Here the aforementioned predetermined load and set point will be selected depending upon the waist belt 2 and the shoulder belt 1 of the belt over the range of 150 to 1000 kg and from 20% to 40% of the point P.

As mentioned above, the seat belt of the present invention is made of a continuous and seamless webbing including the waist portion 2 and the shoulder portion 1, contributing to reduce the number of retractors that will have to be installed in the vehicle room. Moreover, since the webbing of shoulder portion 1 can be made thin and can be taken up by the retractor, it is allowed to make the retractor in small size or to have both the shoulder portion 1 and the waist portion 2 contained in a conventional retractor case. Therefore, in addition to reducing the number of retractors to be used, reasonable use of the retractor can be promoted and the seat belts can be attached to the vehicle room properly. In addition, the seat belt by the present invention, which is made of a single seamless and continuous belt, exhibits excellent performance to absorb energy which is comparable to conventional three-point type energy-absorbing belts. Besides, the belt by the present invention without seams permits the slidable tongue piece to slide smoothly, so that said slidable tongue piece can be retained at any proper and balanced positions to fasten the belts. In case of collision, the impact due to the collision is dispersed between the waist belt and the shoulder belt owing to free sliding of the slidable tongue piece to secure the safety of the human body. The slidable tongue piece also gives improved contact feeling to the human body. As mentioned in the foregoing, the seat belt by the present invention possesses various excellent effects exhibiting rich energy-absorbing performance and meets the demand required by modern vehicles.

While there have been described and illustrated preferred embodiments of the present invention it is apparent that numerous alterations, insertions and additions may be made without departing from the spirit thereof.

I claim:

1. A combined vehicle safety belt shoulder and waist section structure in which said shoulder and waist sections are woven of warps and wefts and possess different strength and elongation properties characterized in that said shoulder and waist sections possess a plurality of common continuous warps with some of said warps in said waist section being discontinued in said shoulder section and said waist section possessing a greater number of warps than said shoulder section and at least some of said common continuous warps possessing high non-recoverable high energy absorbing properties and at least some of said high non-recoverable high energy absorbing warps in said waist section interwoven with wefts therein extending through said shoulder section as core yarns unwoven with wefts in said shoulder section.

2. The structure of claim 1 wherein said shoulder and waist sections are relatively thin and thick respectively.

3. The structure of claim 1 wherein all the warps in said waist section are interwoven with the wefts therein.

4. The structure of claim 1 wherein said waist section includes interwoven layers of greater number than those in said shoulder section.

* * * * *